(12) United States Patent
Luo et al.

(10) Patent No.: US 7,664,665 B2
(45) Date of Patent: Feb. 16, 2010

(54) SYSTEM AND METHOD FOR DISTRIBUTION MANAGEMENT

(75) Inventors: Sheng-Chi Luo, Tu-Chen (TW); Yingchun Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1311 days.

(21) Appl. No.: 10/880,182

(22) Filed: Jun. 28, 2004

(65) Prior Publication Data

US 2005/0015290 A1    Jan. 20, 2005

(30) Foreign Application Priority Data

Jun. 27, 2003    (TW)    ............................... 92117595 A

(51) Int. Cl.
     *G06F 17/60* (2006.01)
(52) U.S. Cl. .......................................... 705/7
(58) Field of Classification Search ...................... 705/7
     See application file for complete search history.

(56) References Cited

U.S. PATENT DOCUMENTS

| | | | |
|---|---|---|---|
| 4,417,630 A * | 11/1983 | Weber et al. | ................... 177/1 |
| 5,434,394 A | 7/1995 | Roach et al. | |
| 6,339,764 B1 | 1/2002 | Livesay et al. | |
| 6,549,891 B1 | 4/2003 | Rauber et al. | |
| 2003/0088486 A1* | 5/2003 | Lee et al. | ....................... 705/28 |

OTHER PUBLICATIONS

A. Gunasekaran (Performance measures and metrics in a supply chain environment), 12/200, International Journal of Operations,and production management, pp. 1-14.*

* cited by examiner

*Primary Examiner*—Romain Jeanty
(74) *Attorney, Agent, or Firm*—Wei Te Chung

(57) ABSTRACT

A system for distribution management includes a database server (1) interconnecting with a database (12) for storing a sales list (120) and a check list (122), an application server (2), a web server (3), and a weighbridge (8) for obtaining weights of vehicles. The application server includes a sales data maintaining module (22), a checking module (26), and a detecting module (28). A method for distribution management includes the steps of: generating a sales bill and a sales record in accordance with sales data; verifying whether a presently input weight matches a net weight of merchandise carried by a vehicle, and verifying whether the net weight matches a weight recorded in the sales record; generating a checking record; and monitoring distribution procedures.

14 Claims, 4 Drawing Sheets

SYSTEM AND METHOD FOR DISTRIBUTION MANAGEMENT

BACKGROUND OF THE INVENTION

1. Field of the Invention

The present invention relates to a computer data processing system in a management information system, and especially to a system and method for distribution management via computers.

2. Background of the Invention

Distribution management is a key aspect of running of a manufacturing or supplying enterprise. Efficient distribution reduces the costs of the enterprise. Many difficulties are inherent in distribution management. Other difficulties result from the absence of proper managing techniques or inefficient implementation of these techniques. In very large-scale enterprises, the task is exceedingly complicated because hundreds of groups of merchandise are distributed each day. Manual procedures and mistakes in interpreting and updating distribution information can significantly increase the costs of distribution management.

Conventionally, inspectors check merchandise to verify whether the actual amount of the merchandise matches a distribution bill. The inspectors check the merchandise item by item in accordance with the distribution bill. However, when hundreds of groups of merchandise are distributed each day, the distribution bill is generally extremely long and complicated. Mistakes occur when the inspectors manually check the merchandise. Generating the distribution bill is troublesome and time wasting. In addition, the distribution bill may contain outdated and imprecise data because it was generated too early prior to inspection.

With the development of online supply chain management, online stocks are being utilized more and more by many large-scale enterprises. Staff of an enterprise can negotiate trading times, trading merchandise, and quality and standard of the trading merchandise with clients via electronic networks. The staff can also detect processing of the merchandise via the networks. U.S. Pat. No. 6,148,291 discloses a system and method for detecting containers and merchandise. The invention teaches a method for tracing and detecting the containers and the merchandise in a fixed area, and collecting data on locations and carriers of the containers via the networks. The invention also teaches a method for generating electronic and paper records to detect the containers, such records comprising arrival time of each container and loading and unloading records of each container. The disclosed system comprises a central process unit for receiving and processing data on the containers, a first database for storing data on the containers, a second database for storing data on the merchandise, one or more inputting devices, a detecting device, a communication device, a receiving device, and a printer. The inputting device, the detecting device and the receiving device are used to receive detected information and input the detected information into the system. Said system exchanges information with a carrier information system, a supplier information system, and a plurality of client computers via networks.

The invention can be used to manage distribution procedures and enhance distribution efficiency. Nevertheless, the invention cannot adequately detect the distribution procedures in accordance with real time distribution information.

SUMMARY OF THE INVENTION

Accordingly, an objective of the present invention is to provide a system and method for collecting real time sales records for monitoring of distribution procedures via a network.

Another objective of the present invention is to provide a system and method for efficiently checking merchandise in accordance with sales records used in distribution of the merchandise.

In order to achieve the above-mentioned objectives, a system for distribution management in accordance with the present invention comprises a database server, an application server, a web server, and a weighbridge. The database server connects with a database that stores a sales list and a check list. The weighbridge obtains weights of vehicles. The application server comprises a sales data maintaining module, a checking module, and a detecting module. The sales data maintaining module is for maintaining sales data, such maintenance comprising generating sales records and sales bills. The detecting module is for displaying one or more checking records and generating a corresponding checking tables. The checking module comprises: an inputting sub-module for obtaining data on the sales bills; a weight obtaining sub-module for obtaining the weight of each vehicle via the weighbridge and computing a net weight of merchandise carried by the vehicle; a verifying sub-module for verifying whether a weight input by an inspector matches the net weight of merchandise carried by the vehicle, and for verifying whether the net weight matches a weight recorded in a corresponding sales record; and a recording generating sub-module for generating a corresponding checking record and storing the checking record in the check list. The web server provides a platform for users to access the system.

Further, a method for distribution management in accordance with the present invention comprises the steps of: (a) generating a sales bill and a sales record in accordance with sales data; (b) verifying whether a presently input weight matches a net weight of merchandise carried by a vehicle, and verifying whether the net weight matches a weight recorded in the sales record; (c) generating a checking record if the input weight matches the net weight and the net weight matches the weight recorded in the sales record; and (d) monitoring distribution procedures by displaying different checking records, and generating a checking table.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Reference will now be made to the drawings to describe the present invention in detail.

Figure 1:
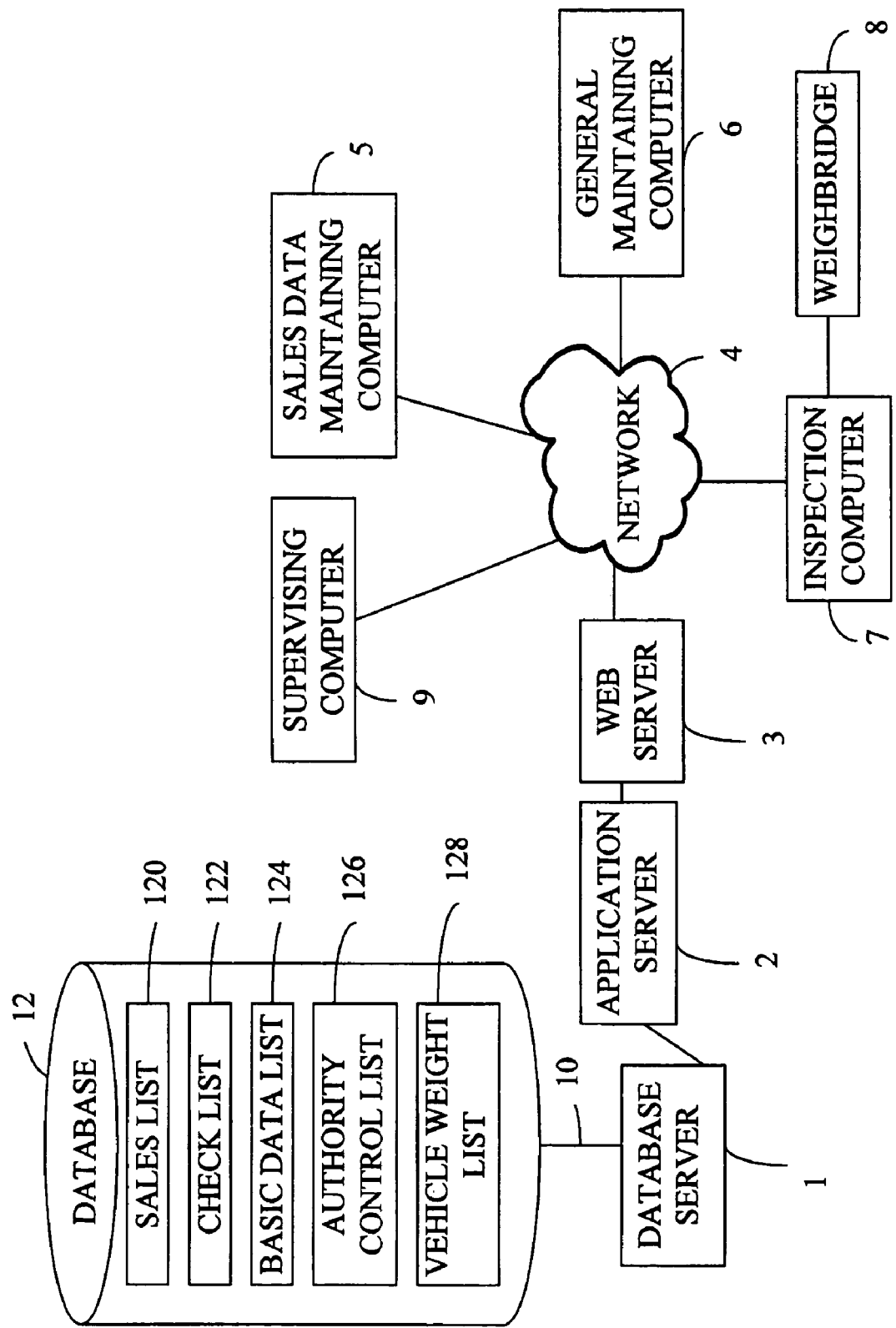
FIG. 1 is a schematic diagram of hardware configuration of a system for distribution management of the present invention.

FIG. 1 is a schematic diagram of hardware configuration of a system for distribution management in accordance with a preferred embodiment of the present invention. The system for distribution management is deployed on a server/browser configuration system. The server/browser configuration system comprises a plurality of servers, the servers comprising a database server 1, an application server 2 and a web server 3.

The database server 1 stores all structured data of an enterprise that employs the system for distribution management, for managing processing of the stored data. Such processing includes reading, writing, deleting, modifying, backup and searching. In particular, a connection 10 connects the database server 1 with a database 12. The connection 10 can be an open database connectivity (ODBC), or a Java database connectivity (JDBC). The database 12 stores a plurality of sales data lists, the sales data lists comprising a sales list 120, a check list 122, a basic data list 124, an authority control list 126 and a vehicle weight list 128.

The sales list 120 stores data on IDs of sales bills, sales distributors, names of buyers, types of merchandise, names of merchandise, weights, sales times, and IDs of vehicles that transport corresponding merchandise. The check list 122 stores a plurality of checking records. The checking records comprise data on the IDs of sales bills, names of sales distributors, the names of buyers, the types of merchandise, the names of merchandise, the weights, the sales times, the IDs of vehicles, names of inspectors, and checking times. The basic data list 124 is for recording the names of sales distributors, the names of buyers, and the types of merchandise. The authority control list 126 stores data on names of users, passwords of user names, and types of users. The types of users comprise a system data maintainer, a sales data maintainer, an inspector, and a supervisor. The different user types have different data processing restrictions. For example, a sales data maintainer can only maintain sales data, whereas a system data maintainer can maintain system data. The vehicle weight list 128 is used for storing data on IDs of vehicles, inbound weights of vehicles, and outbound weights of vehicles. The inbound weights of vehicles are weights of the vehicles when they enter a factory through an inspection area, and the outbound weights of vehicles are weights of the vehicles when they leave the factory through the inspection area.

The application server 2 contains core and mutable enterprise logic (such as rules, execution, and management) of the system for distribution management. The application server 2 comprises a plurality of software modules (described in detail below in relation to FIG. 2), and provides functions for managing distribution.

The web server 3 provides users with an interface for utilizing the system for distribution management. The users can access the web server 3 through a terminal computer which connects with the web server 3 via a network 4. The terminal computer can be a sales data maintaining computer 5, a general maintaining computer 6, an inspection computer 7, or a supervising computer 9. A system data maintainer maintains the system data of the system via the general maintaining computer 6. Such maintenance comprises adding, amending or deleting data on the sales distributors, the buyers and the types of merchandise stored in the basic data list 124. A sales data maintainer maintains sales data via the sales data maintaining computer 5. Such maintenance comprises adding, amending, or deleting sales records stored in the database 12. The sales data maintainer can obtain the sales list 120 via the sales data maintaining computer 5, the sales list 120 comprising data on sales such as sales distributors and buyers. An inspector checks the vehicles and the merchandise with the aid of the inspection computer 7. The inspection computer 7 is located at the inspection area of the factory, and connects with a weighbridge 8 for obtaining weights of vehicles. A supervisor can monitor the vehicles and the merchandise via the supervising computer 9, and generate a corresponding checking table.

Figure 2:
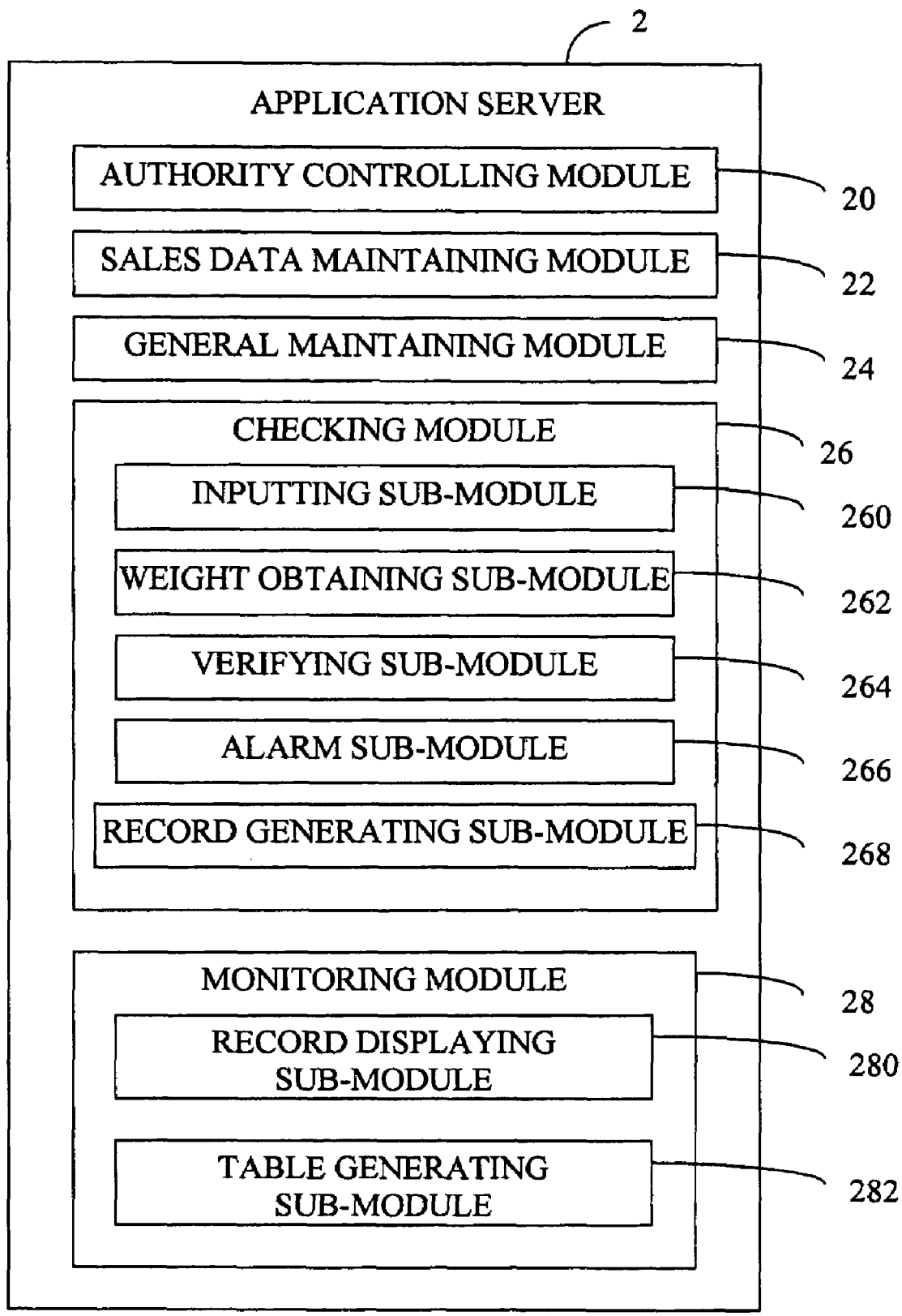
FIG. 2 is a schematic diagram of function modules of an application server of the system of FIG. 1.

FIG. 2 is a schematic diagram of function modules of the application server 2. The application server 2 comprises an authority controlling module 20, a sales data maintaining module 22, a general maintaining module 24, a checking module 26, and a detecting module 28. The authority controlling module 20 is used to control authorities granted to different users in accordance with the authority control list 126, in order to limit processes that can be performed by the users. The sales data maintaining module 22 is for maintaining sales data, such as adding and amending sales records. The general maintaining module 24 is used for maintaining system data, such system data comprising data on the sales distributors, the buyers and the types of merchandise.

The checking module 26 is programmed to check sales bills delivered by the buyers as the vehicles of the buyers pass through the inspection area. The checking module 26 comprises an inputting sub-module 260, a weight obtaining sub-module 262, a verifying sub-module 264, an alarm sub-module 266, and a record generating sub-module 268. The inputting sub-module 260 obtains the sales bills input by the inspectors. The weight obtaining sub-module 262 is used for obtaining weights of the vehicles provided by the weighbridge 8, and storing the weights in the vehicle weight list 128. The obtained weights are of two types: inbound weight and outbound weight. The weight obtaining sub-module 262 also computes net weight of merchandise carried by each vehicle. The net weight is calculated by deducting the inbound weight of the vehicle from the outbound weight of the vehicle. The verifying sub-module 264 is for comparing a net weight recorded in a sales record with a corresponding net weight obtained by the weight obtaining sub-module 262, in order to verify the sales record. The alarm sub-module 266 outputs alarm messages to the supervising computer 9 when discrepancies are found. Such discrepancies comprise the sales record not existing, and the net weight recorded in a sales record not according with the corresponding net weight obtained by the weight obtaining sub-module 262. The alarm messages comprise data on types of discrepancies. The record generating sub-module 268 records data on the inspectors, the checking times and checking records if the sales records match the corresponding sales data.

The detecting module 28 is for monitoring checking procedures on outbound sales, and generating the checking tables. The detecting module 28 comprises a record displaying sub-module 280, and a table generating sub-module 282. The record displaying sub-module 280 is used to display checking records obtained in accordance with parameters input by the supervisor. The parameters comprise data on checking times, sales distributors, merchandise types, merchandise names, and so on. The table generating sub-module 282 is used for generating the checking tables in accordance with the checking records obtained by the record displaying sub-module 280.

Figure 3:
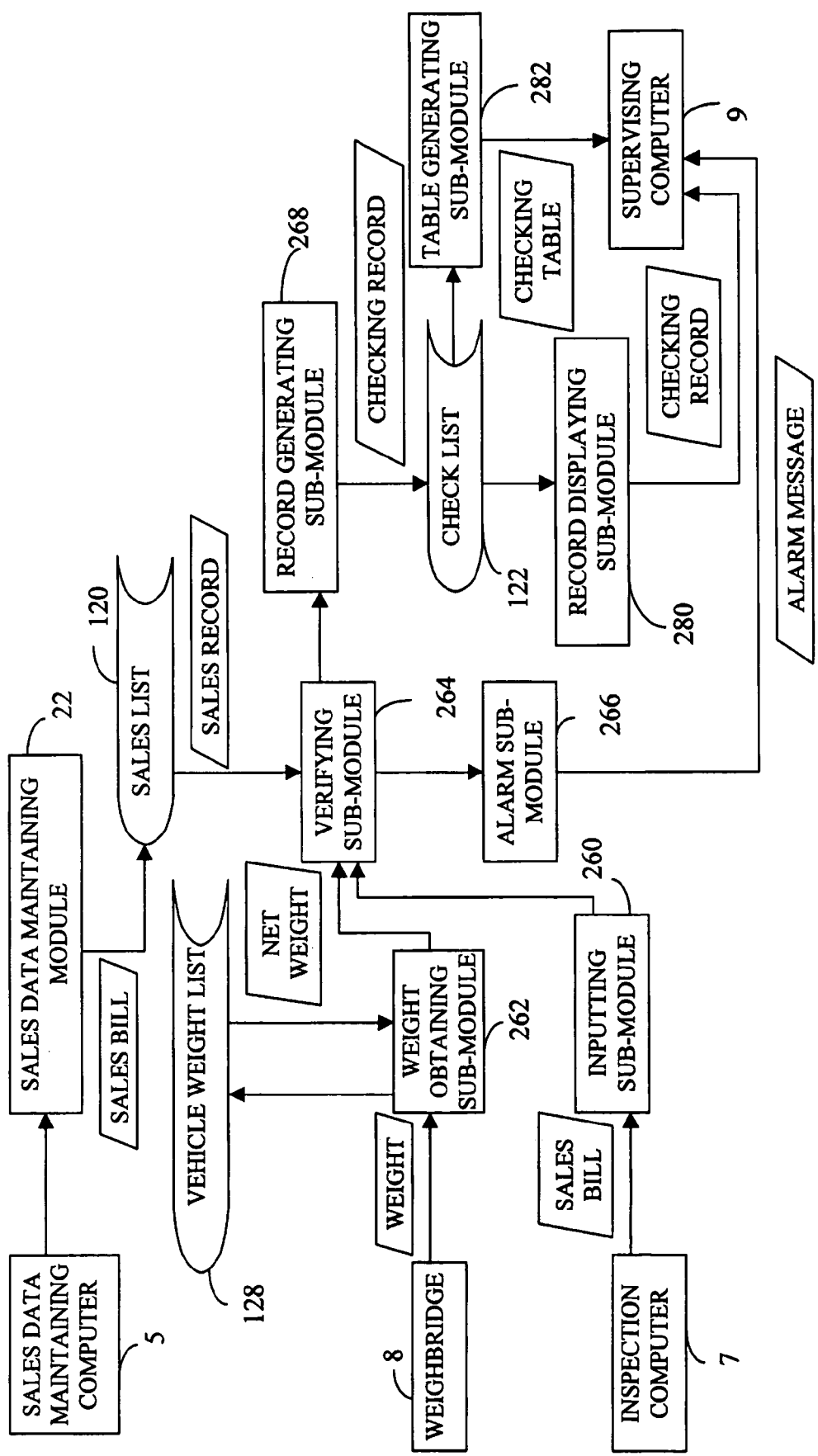
FIG. 3 is a data flow diagram of the system of FIG. 1.

FIG. 3 is a diagram of data flow of the system for distribution management. The sales data maintaining module 22 receives a sales record input by a sales data maintainer via the sales data maintaining computer 5, and stores the sales record in the sales list 120 in the database 12. The weight obtaining sub-module 262 obtains an inbound weight and an outbound weight of a vehicle via the weighbridge 8, stores the inbound weight and the outbound weight in the vehicle weight list 128, and computes a net weight of outbound merchandise. The inputting sub-module 260 receives a sales bill input by an inspector at the inspection computer 7, and sends the sales bill to the verifying sub-module 264.

The verifying sub-module 264 obtains a sales record in accordance with the sales bill and the net weight of the outbound merchandise, determines whether a corresponding sales record exists in the sales list 120, and compares the obtained sales record with the corresponding sales record stored in the sales list 120. The verifying sub-module 264 also determines whether the obtained sales record accords with the sales record stored in the sales list 120, and whether the net weight of the outbound merchandise matches the obtained sales record. If the corresponding sales record does not exist, the obtained sales record does not accord with the sales record stored in the sales list 120, or the net weight of the outbound merchandise does not match the obtained sales record, then the alarm sub-module 266 generates an alarm message and outputs the alarm message to the supervising computer 9. If no discrepancies are found, the record generating sub-module 268 generates a checking record, and stores the checking record in the check list 122. The checking record comprises data on the inspector and a checking time. The record displaying sub-module 280 searches in the check list 122 to obtain desired checking records according to one or more parameters. Such parameters comprise checking time, sales distributor, and name of merchandise. The record displaying sub-module 280 also displays the obtained checking records on the supervising computer 9. The table generating sub-module 282 generates a checking table in a designated format in accordance with the obtained checking records.

Figure 4:
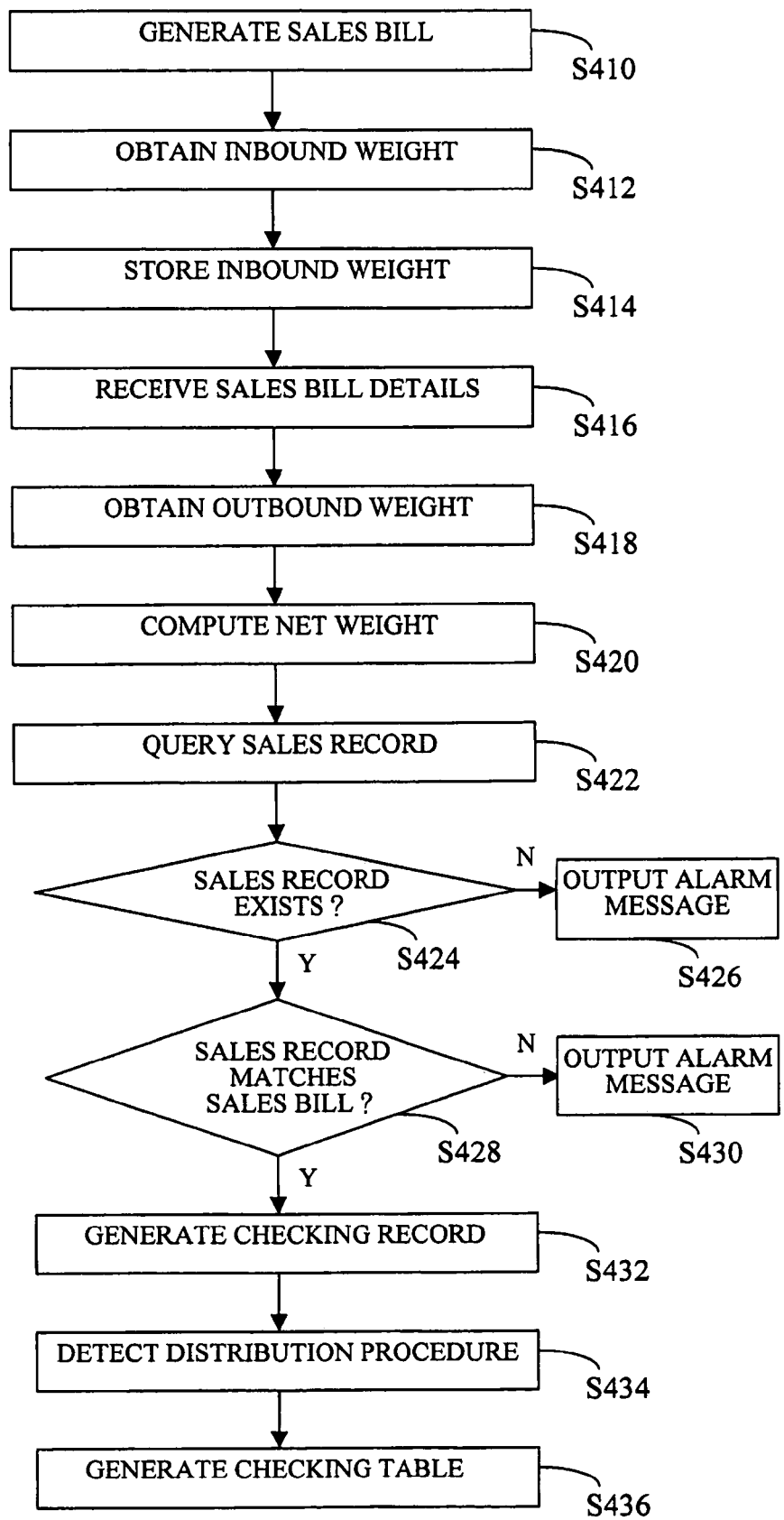
FIG. 4 is a flow chart of a preferred method of the present invention for distribution management.

FIG. 4 is a flow chart of the preferred method for distribution management. In step S410, the sales data maintaining module 22 receives sales records input by a sales data maintainer, and generates a sales bill in accordance with the input sales records. The sales bill is sent to a corresponding buyer as a sales confirmation. In step S412, the weighbridge 8 obtains an inbound weight of a vehicle as the vehicle enters a factory via an inspection area, and sends the inbound weight to the weight obtaining sub-module 262 via the inspection computer 7. In step S414, the weight obtaining sub-module 262 stores the inbound weight in the vehicle weight list 128. In step S416, the inputting sub-module 260 receives details of a sales bill input by an inspector. The sales bill is delivered by the buyer as the vehicle of the buyer leaves the factory through the inspection area. In step S418, the weight obtaining sub-module 262 obtains an outbound weight from the weighbridge 8 via the inspection computer 7. In step S420, the weight obtaining sub-module 262 accesses the vehicle weight list 128 to obtain the inbound weight of the vehicle, and computes a net weight of merchandise carried by the vehicle.

In step S422, the verifying sub-module 264 queries a corresponding sales record in the sales list 120 in accordance with an ID of the sales bill. In step S424, the verifying sub-module 264 determines whether a sales record matching the ID of the sales bill exists. If said sales record does not exist, in step S426, the alarm sub-module 266 outputs an alarm message to the supervising computer 9. If said sales record exists, in step S428, the verifying sub-module 264 compares the sales record with the data of the sales bill, and determines whether data stored in the sales record match the data of the sales bill. Such data comprise data on the sales distributors, the buyers, the merchandise, and the net weight of the merchandise carried by the vehicle. If the data stored in the sales record do not match the data of the sales bill, in step S430, the alarm sub-module 266 outputs an alarm message to the supervising computer 9. If the data stored in the sales record match the data of the sales bill, in step S432, the record generating sub-module 268 generates a checking record, and stores the checking record in the check list 122. The checking record comprises a name of the inspector and the checking time. In step S434, a supervisor accesses the web server 3 via the supervising computer 9 to obtain up-to-data information on the progress of distribution procedures. The record displaying sub-module 280 queries different checking records in the check list 122 according to different parameters input by the supervisor. The parameters can be data on checking time, sales distributor, merchandise name, or merchandise type. In step S436, the table generating sub-module 282 generates a checking table in accordance with the obtained checking records.

Although only a preferred embodiment and a preferred method of the present invention have been described in detail above, those skilled in the art will readily appreciate that many modifications to the preferred embodiment and method are possible without materially departing from the novel teachings and advantages of the present invention. Accordingly, all such modifications are deemed to be covered by the following claims and allowable equivalents of the claims.

What is claimed is:

1. A system for distribution management, the system comprising:
   a database server that connects to a database comprising a sales list and a check list stored thereon;
   a weighbridge configured for obtaining weights of vehicles;
   an application server connected to the database server and the weighbridge by a network, the application server comprising:
   a sales data maintaining module for generating sales records and sales bills in accordance with the sales list stored in the database and storing the sales records and sales bills in the database;
   a checking module configured for obtaining the sales bills from the database, obtaining the weight of each vehicle from the weighbridge, verifying whether a presently input weight obtained from the weighbridge matches the net weight of merchandise carried by the vehicle and whether the net weight matches a weight recorded in a corresponding sales record, wherein the sales bills and the sales records are used to generate a checking record if the input weight marches the net weight and the net weight matches the weight recorded in the sales records;
   for outputting alarm messages when discrepancies between the presently input weight, the net weight of merchandise carried by the vehicle and the weight in the corresponding sales record are found; and
   a processor to execute the sales data maintaining module and the checking module.

2. The system as claimed in claim 1, wherein the weight of each vehicle comprises an inbound weight and an outbound weight.

3. The system as claimed in claim 1, wherein the checking record comprises data on an inspector and a checking time.

4. The system as claimed in claim 1, wherein the database further comprises an authority control list for recording authorities of users.

5. The system as claimed in claim 1, wherein the checking module is further configured for generating corresponding checking records and storing the checking records in the check list in the database.

6. The system as claimed in claim 1, wherein the system further comprises a detecting module for displaying one or more checking records and generating corresponding checking tables.

7. The system as claimed in claim 1, wherein the system further comprises a web server for providing a platform for users to access the system.

8. A method for distribution management executed by an application server comprising a processor, the method comprising using the processor to execute the steps of:
   generating a sales bill and a sales record in accordance with sales data stored in the database and storing the sales bill and sales record in the database;
   obtaining a presently input weight of a vehicle using a weighbridge;
      obtaining an inbound weight when the vehicle enters a factory through an inspection area;
      obtaining an outbound weight when the vehicle leaves the factory through the inspection area;
      computing the net weight of the merchandise carried by the vehicle in accordance the inbound weight and the outbound weight;
   using the sales bill and the sales record to generate a checking record if the input weight matches the net weight and the net weight matches the weight recorded in the sales record; and
   outputting a first alarm message if there is no sales record matching the sales bill.

9. The method as claimed in claim 8, wherein the checking record comprises data on an inspector and a checking time.

10. The method as claimed in claim 8, further comprising:
    displaying a corresponding checking records and generating corresponding checking tables.

11. The method as claimed in claim 10, further comprising:
    outputting a second alarm message if any data stored in the sales bills do not match the sales records.

12. The method as claimed in claim 11, further comprising:
    outputting a third alarm message if the net weight of the merchandise carried by the vehicle does not match the sales records.

13. A distribution management system executed by an application server comprising a processor, the system comprising:
    at a web server connected to a network, storing a sales list and a check list into a database;
    generating sales records and sales bills in accordance with the sales list stored in the database;
    using a weighbridge to obtain a weight of a vehicle positioned on the weighbridge;
    verifying whether the weight of the vehicle matches a net weight of merchandise carried by the vehicle;
    verifying whether the net weight matches a weight recorded in a corresponding sales record;
    monitoring the sales list according to checking procedures, wherein the checking procedures are user-determined according to an authorized list of users of the web server;
    generating a checking record if the weight matches the net weight and the net weight matches the weight recorded in the sales record; and
    outputting alarm messages when discrepancies between the presently input weight, the net weight of merchandise carried by the vehicle and the weight in the corresponding sales record are found, wherein the sales bills and the sales records are used to generate a checking record if the input weight marches the net weight and the net weight matches the weight recorded in the sales records.

14. The system in claim 13, wherein the check list comprises data selected from the group consisting of identification of the sales bills, names of sales distributors, names of buyers, types of merchandise, names of merchandise, the weight, sales times, identification of vehicles, names of inspectors, and checking times.

* * * * *

UNITED STATES PATENT AND TRADEMARK OFFICE
CERTIFICATE OF CORRECTION

PATENT NO. : 7,664,665 B2 Page 1 of 1
APPLICATION NO. : 10/880182
DATED : February 16, 2010
INVENTOR(S) : Luo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1633 days.

Signed and Sealed this

Thirtieth Day of November, 2010

David J. Kappos
*Director of the United States Patent and Trademark Office*